United States Patent [19]
DeLuca

[11] Patent Number: 6,064,354
[45] Date of Patent: May 16, 2000

[54] STEREOSCOPIC USER INTERFACE METHOD AND APPARATUS

[76] Inventor: Michael Joseph DeLuca, 1104 Claire Ave., Austin, Tex. 78703

[21] Appl. No.: 09/108,814

[22] Filed: Jul. 1, 1998

[51] Int. Cl.[7] .................................................. G09G 5/00
[52] U.S. Cl. .................................. 345/7; 345/8; 345/419
[58] Field of Search ............................. 345/7, 8, 9, 419; 348/42, 47, 51

[56] References Cited

U.S. PATENT DOCUMENTS

| | | | |
|---|---|---|---|
| 5,025,314 | 6/1991 | Tang et al. | 358/93 |
| 5,168,531 | 12/1992 | Sigel | 382/48 |
| 5,239,373 | 8/1993 | Tang et al. | 358/93 |
| 5,694,142 | 12/1997 | Dumoulin et al. | 345/9 |
| 5,767,842 | 1/1998 | Korth | 345/168 |

FOREIGN PATENT DOCUMENTS 08139994  9/1994  Japan .

Primary Examiner—Richard A. Hjerpe
Assistant Examiner—Ronald Laneau

[57] ABSTRACT

A computer system stereoscopically projects a three dimensional object having an interface image in a space observable by a user. The user controls the movement of a physical object within the space while observing both the three dimensionally projected object and the physical object. The computer system monitors the position of the user to determine the position of the interface image within the space and further monitors the movement of the physical object to determine its position. A control signal is generated in response to the position of the physical object intersecting the position of the interface image. For example, a word processing program is indicated by an interface image such as an icon including the letter "W" three dimensionally projected within the space. The word processing program is activated when the user's finger moves within the space to touch the projected icon. The interface allows the user to observe the projected icon, physical finger and their intersection within the space. The physical object may also be extended with a stereoscopic extension image generated by the computer system in response to determining the position and orientation of the physical object.

20 Claims, 3 Drawing Sheets

6,064,354

STEREOSCOPIC USER INTERFACE METHOD AND APPARATUS

FIELD OF THE INVENTION

This invention generally relates to the area of computer user interfaces and more particularly to virtual three dimensional user interfaces.

BACKGROUND OF THE INVENTION

Graphical user interfaces have become a standard for interfacing between a user and a computer. Such interfaces are in wide use in computer operating system interfaces produced by Apple, Microsoft and others. These interfaces are limited in that they are intended for interfacing between a user and a computer having a two dimensional display such as a CRT or LCD. A user activates the interface with a key board and or a pointing device such as a mouse pointing to an icon on the display. Advancements have been made with the advent of a touch screen which allows a user to approximately contact the icon or intended area of the graphical user interface in order to use the interface. However, contact with the touch screen can contaminate the display area of the screen with finger prints and other types of smudges. Also, constant physical contact with the touch screen can result in its mechanical failure. Thus, what is needed is a way to contact user interface images without contacting a keyboard or a mouse or the display itself.

Three dimensional image displays are improving. Several types of three dimensional displays are known including stereoscopic displays which display a virtual three dimensional image using filters to highlight images intended for each eye of the viewer, thereby providing a stereoscopic or three dimensional affect. Such systems alternately flash images for the left and right eye of the user and require a filter for each eye, usually included in glasses worn by the viewer. Systems are in public use which require glasses may have color filters, orthogonally polarized lenses, or actively switched lenses, and the display is correspondingly modulated with left and right eye images to provide the three dimensional effect. Furthermore, stereoscopic displays which do not require glasses have been described, descriptions are included in U.S. Pat. No. 4,987,487, Jan. 22, 1991, to Ichinose et al. entitled Method of stereoscopic images display which compensates electronically for viewer head movement, and U.S. Pat. No. 5,365,370, Nov. 15, 1994, to Hudgins entitled Three dimensional viewing illusion with 2D display. Yet another stereoscopic display system in completely contained in a head set worn apparatus as described in U.S. Pat. No. 5,673,151 Sep. 30, 1997 to Dennis entitled Image correction in a virtual reality and heads up display. The aforesaid patents are incorporated by reference. The aforesaid stereoscopic displays allow the viewer to simultaneously observe both a stereoscopic object, appearing to be generally set apart in three dimensions from the image projection means, and a physical object, such as the hand of the user, in approximately the same perceived space. What is needed is a method and apparatus by which the intersection of the physical object and the stereoscopic object can form a user interface with a computer system.

OBJECT OF THE INVENTION

It is therefor an object of the invention to provide a three dimensional display system capable of determining an intersection of a physical object with a three dimensionally displayed object in a space where the three dimensional object is viewed and generating a control signal in response thereto. The control signal may cause modification of the displayed image or control another device. The display system is also capable of extending the physical object with a three dimensional extension image and then using the extended image to determine the intersection.

DETAILED DESCRIPTION OF THE INVENTION

Figure 1:
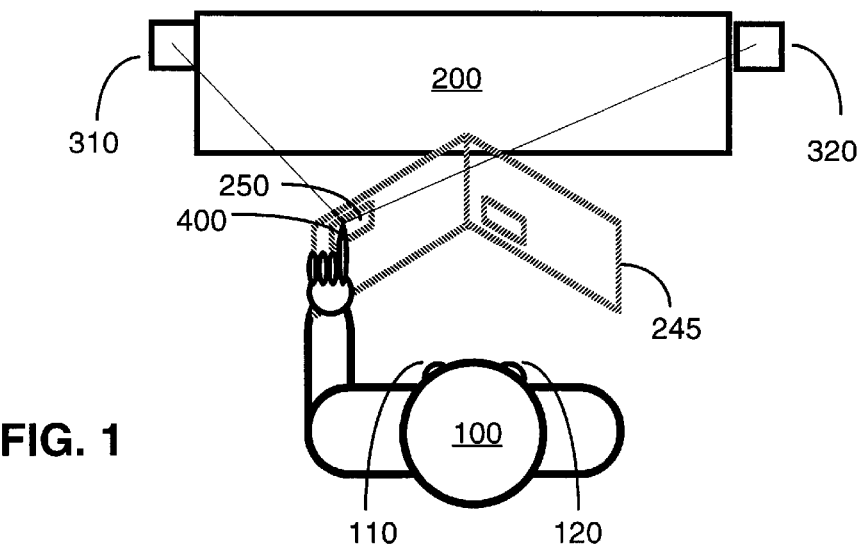
FIG. 1 shows a perspective view of a user causing an intersection of a physical object with a three dimensional stereoscopic object projected by a display.

FIG. 1 shows a perspective view of a user causing an intersection of a physical object with a three dimensional stereoscopic object projected by a display. The user 100 has left and right eyes 110 and 120 which are used to view a display 200 which projects a three dimensional stereoscopic object 245 in a space between the user and the display. The stereoscopic object has a stereoscopic interface image 250. Using pattern recognition and triangulation, images from video cameras 310 and 320 are used to determine the position of physical objects within the space, such as the position of the user 100 and the user's finger 400. As will be described herein, a control signal is generated in response to the intersection of the interface image 250 and a physical object 400. For example, the stereoscopic object 245 projected by the display 200 could be the image of an open book, including readable text on pages of the book. Interface image 250 could be an icon indicating that contact with the icon would cause a page in the book to turn. When the finger tip 400 of the user touches the icon 250, a control signal is generated causing a new image 245 of a book to be displayed with a turned page. The stereoscopic three dimensional image has the advantage of being projected in a space, no physical contact with a keyboard, mouse or touch screen is needed to generate a control signal to turn a page of the book. Rather, an intuitive action of a user appearing to make physical contact with a three dimensional image in the space causes generation of the control signal. The user sees the interface image in a three dimensional space and simply uses a finger to touch the interface image to cause a response. The user has an actual view of the finger, with which the user has had a life time to become familiar. touching a virtual stereoscopic object similar to the way the user has spent a life time touching physical objects. This provides for an intuitive interface.

The stereoscopic projector 200 can be any of several display means capable of displaying three dimensional images. Some projectors require the user to wear colored, polarized of active image filter glasses (not shown) to observe the three dimensional image while others are totally contained within a display headset worn by the user, yet another requires only a display separate from the user and no glasses at all. While all displays capable of displaying a three dimensional image are contemplated, the latter is preferred because of the convenience to a user requiring no physical contact with the means necessary to display three dimensional images.

Figure 2:
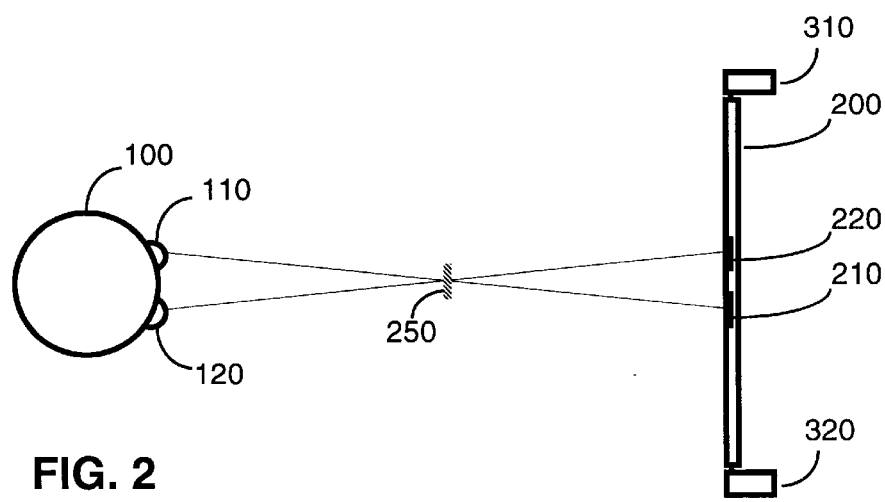
FIG. 2 shows the display of the stereoscopic interface image.

FIG. 2 shows the display of the stereoscopic interface image. Display 200 displays an image 210 for viewing by the left eye 110 of the user 100 while image 220 displayed for viewing by the right eye 120 of user 100. As a result, stereoscopic interface image 250 appears to occur in a space between the user 100 and the display 200 at a position indicated by the intersection of a line from eye 110 to image 210 and a second line from eye 120 to image 220.

Figure 3:
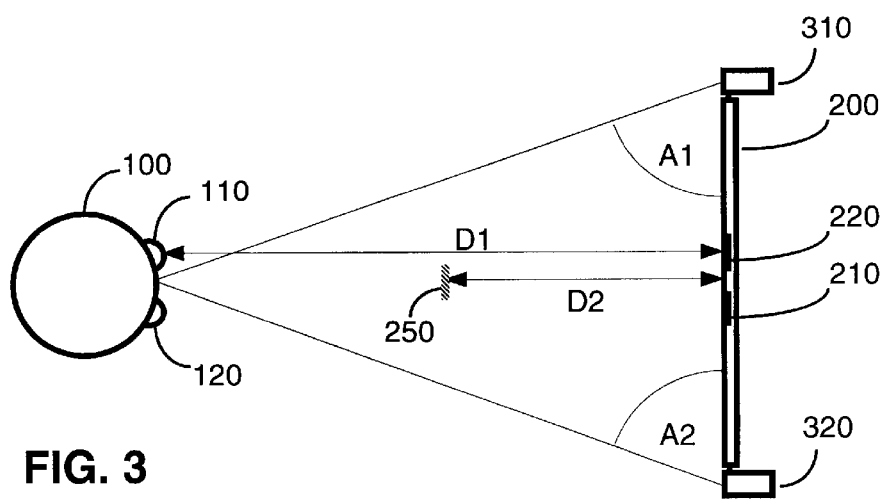
FIG. 3 shows determination of the position of the stereoscopic interface image.

FIG. 3 shows determination of the position of the stereoscopic interface image. The position is dependent upon the distance between images 210 and 220, the distance between the eyes 110 and 120 of the user 100 and the position of the user including distance D1 between the display 200 and the user. Preferably, the size of display 200 is predetermined and the image 250 is determined by the computer generating the image. Consequently the distance between images 210 and 220 is also predetermined. The distance between the eyes 110 and 120 can be entered by the user as a calibration procedure prior to operating the user interface means, or can be determined by pattern recognition from images recorded by cameras 310 and 320. The position of the user including the distance between the user and the display can determined by pattern recognition by the images recorded by cameras 310 and 320 to determine a common point relative to the user. Pattern recognition of images of faces and other physical objects are well known, such descriptions can be found in references including U.S. Pat. No. 5,680,481 Oct. 21, 1997 to Prasad et al. entitled Facial feature extraction method and apparatus for a neural network acoustic and visual speech recognition system, U.S. Pat. No. 5,715,325 Feb. 3, 1998 to Bang et al. entitled Apparatus and method for detecting a face in a video image, and U.S. Pat. No. 5,719,951 Feb. 17, 1998 to Shackeleton et al. entitled Normalized image feature processing, which are hereby incorporated by reference. The common point may be the area between the eyes of the user. Alternately, the identification of the common point may be simplified by adding a fiducial mark at the desired point to assist in identifying the desired point and its corresponding angle. Such a mark could be a colored dot placed between the eyes or at the tip of the nose, or marks on glasses worn by the user, the mark could be further illuminated to simplify patter recognition of images received by the video camera. Thereafter, triangulation is performed to determine the position of the user including D1. D1 is a geometric solution of a predetermined distance between cameras 310 and 320 angles A1 and A2 found from images recorded by cameras 310 and 320. Thus, the position including D2 of interface image 250 is readily geometrically determined from the aforesaid determinations. It should be appreciated that the three dimensional display means can be constructed such that the position of the user and the distance D1 is predetermined in order for the user to correctly view the stereoscopic effect. Furthermore, the distance between the eyes 110 and 120 can also be predetermined to be an average distance between eyes of a number of users. This simplifies determination of the position of interface image 250 without departing from the spirit and scope of the invention. FIG. 3 shows determining the position of interface image 250 from a top view, it should be appreciated that a similar analysis applies to determining the position of interface image 250 from a side view, thus providing a three dimensional position of the user 100 and the interface image 250.

Figure 4:
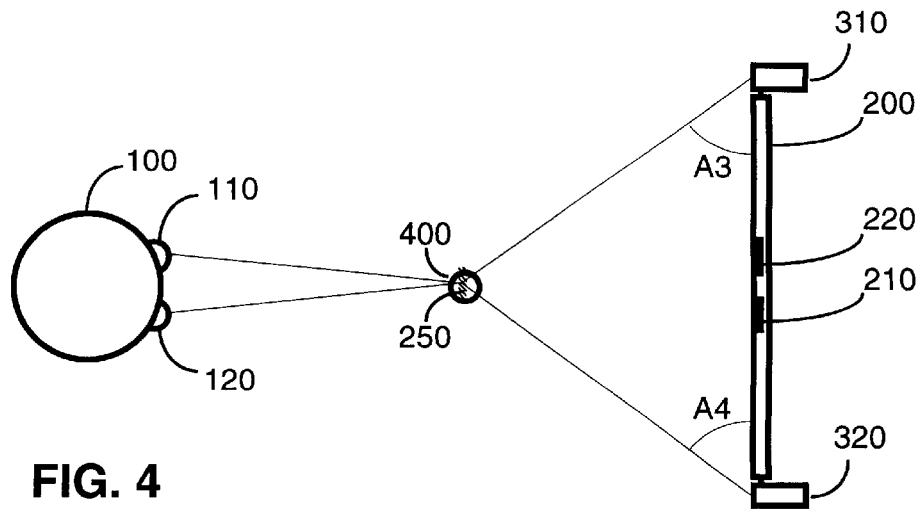
FIG. 4 shows a physical object intersecting the stereoscopic interface image.

FIG. 4 shows a physical object intersecting the stereoscopic interface image. Physical object 400 can be any physical object where the position of the object can be determined. In FIG. 1, the physical object corresponds to the tip of the finger of the user. Pattern recognition is used to determine the position of the physical object and the tip of the finger of the user. Alternately a fiducial mark such as the aforementioned colored or illuminated dot may be added to assist pattern recognition. Once the desired point is identified from the images recorded by cameras 310 and 320, angles A3 and A4 may be determined. Given angles A3 and A4, and the predetermined distance between cameras 310 and 320, the position of the physical object 400 may be geometrically determined. FIG. 4 shows determining the position of the physical object from a top view, it should be appreciated that a similar analysis applies to determining the position of the physical object from a side view, thus providing a three dimensional position of physical object 400. Upon determination of a substantial intersection of the position of interface image 250 and physical object 400, a control signal is generated. The control signal may result in the modifications of the image or the control another device such as a printer or modem.

FIG. 4 shows a computer system which stereoscopically projects a three dimensional object having an interface image in a space observable by a user. The user controls the movement of a physical object within the space while observing both the three dimensionally projected object and the physical object. The computer system monitors the position of the user to determine the position of the interface image within the space and further monitors the movement of the physical object to determine its position. A control signal is generated in response to the position of the physical object intersecting the position of the interface image. For example, a word processing program is indicated by an interface image such as an icon including the letter "W" three dimensionally projected within the space. The word processing program is activated when the user's finger moves within the space to touch the projected icon. The interface allows the user to observe the projected icon, physical finger and their intersection within the space.

Figure 5:
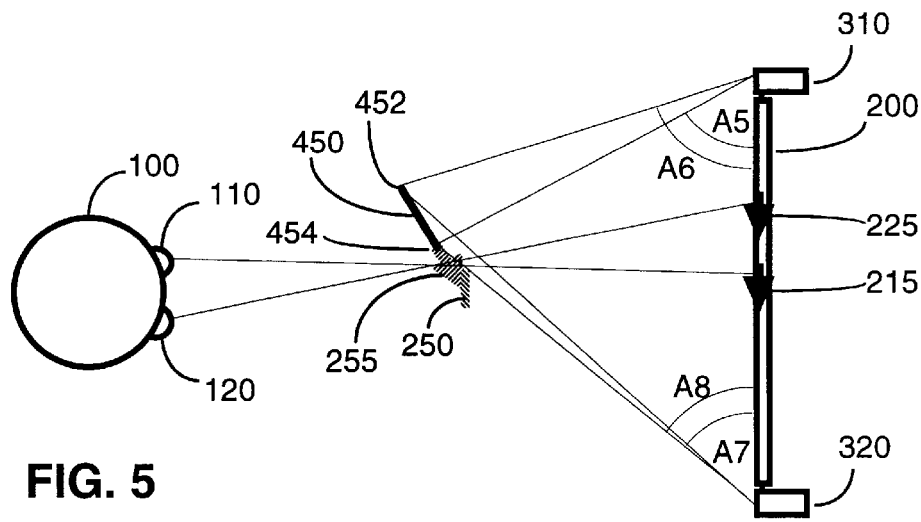
FIG. 5 shows a stereoscopic extension of the physical object intersecting the stereoscopic interface image.

FIG. 5 shows a stereoscopic extension of the physical object intersecting the stereoscopic interface image. In this alternative embodiment, the physical object is shown as a bar 450 having a first and second end 452 and 454 with a stereoscopic extension image 255 projecting from end 454. The orientation and position of the physical object is determined by determining the positions of end points 452 and 454 from images recorded by cameras 310 and 320. The end points can be found by pattern recognition or by adding of differing colored fiducial marks at either end of the bar. The position of end point 452 may be determined from angles A6 and A8 of images from cameras 310 and 320 respectively while the position of end point 454 may be determined from angles A5 and A7 from cameras 310 and 320 respectively. FIG. 5 shows determining the position of the end points from a top view, it should be appreciated that a similar analysis applies to determining the position of the end points from a side view, thus providing a three dimensional position of end points 452 and 454. From the position of the two end points, the orientation of the physical object 450 may be determined. In response to the determined position and orientation of physical object 450 and the determined position of user 100, a stereoscopic extension image 255 is created such that the extension image appears to be an extension of the physical object. In FIG. 5, the extension image 255 is shown as a line extending along the line of physical object 450 with an arrow head tip. The length and shape of the extension image is predetermined and may vary from application to application. The stereoscopic extension image 255 is created by displaying images 215 and 225 on display 200 for view by eyes 110 and 120 respectively. A control signal is generated when the position of a predetermined portion of the stereoscopic extension image, such as the tip of the arrow head, intersects the position of the stereoscopic interface image.

Figure 6:
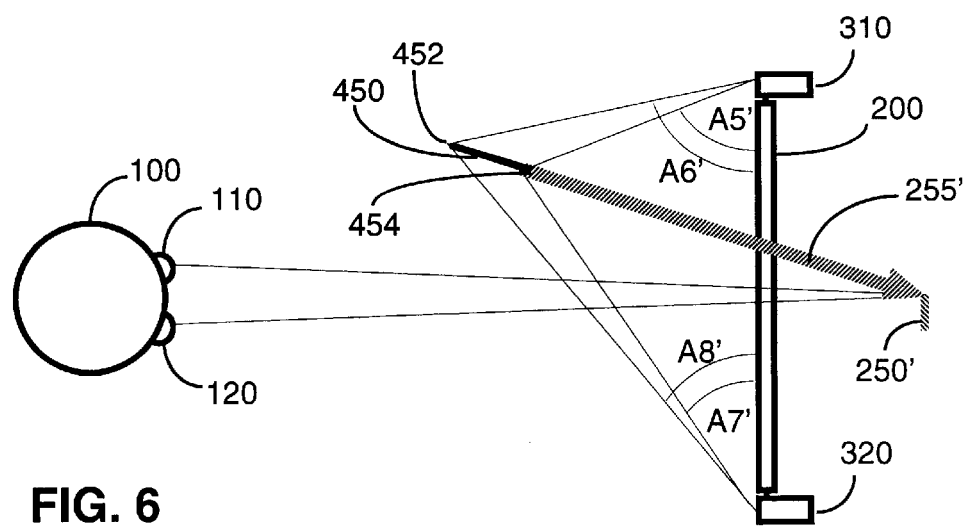
FIG. 6 shows a stereoscopic extension image of the physical object intersecting the stereoscopic interface image wherein the intersection is behind the display.

FIG. 6 shows a stereoscopic extension image of the physical object intersecting the stereoscopic interface image wherein the intersection is behind the display 200. FIG. 6 is similar to FIG. 5 in that both show a stereoscopic extension image, 255 and 255', intersecting a stereoscopic interface image, 250 and 250'. However in FIG. 5 the intersection is in front of display 200, while in FIG. 6 the intersection is behind display 200. The position and orientation of physical object 450 is determined by determining the position of end points 452 and 454 via cameras 310 and 320 and angles A5', A6', A7' and A8'. In this case the resulting extension image 255' is shown to have a substantially longer predetermined length than image 255 of FIG. 5. If display 200 were not a heads-up stereoscopic display, but rather a conventional LCD or CRT, then the intersection between a physical object and an interface image could not occur if the position of the interface image were behind the display because either the space is physically occupied by another object or the user could not see the physical intersection through the display. The extension image has the advantage of enabling intersections to occur in positions appearing behind the display 200, or in other positions out of reach of the user, while allowing the user to directly view the physical object used to cause the intersection.

Physical object 450 has been referred to as a bar, but it should be appreciated that the physical object could be any of a number of physical objects including the finger of the user where one end is the finger tip and the other end is a joint of the finger. Fiducial marks could be added to the points on the finger to facilitate pattern recognition of images recorded by the cameras. While the extension image is shown as a line with an arrow head, other types of extension images may be used depending upon the application. The stereoscopic extension may be considered a virtual end effect for a physical handle, a wide variety of end effects may be created by the computer system. For example a paint brush could be used for paining a virtual object, the handle being the physical object and the brush bristles and paint color the being end effect while the interface image appears as a paint canvas mounted on and three dimensional easel image. In a medical application, the physical object could be the handle and the end effect extension image the blade of a scalpel while the stereoscopic interface image part of a three dimensional image simulating surgery. Alternately in a game application the stereoscopic extension image could be a laser beam, rocket, bullet or bolt of lightning appearing to emanate from the finger of the user along a three dimensional vector defined by the finger, the stereoscopic interface image may be a villain or enemy tank moving in three dimensions.

It should also be appreciated that the position and orientation of the user 100 and physical object 450 have been described as being determined by two cameras with pattern recognition which triangulate in order to determine the corresponding position and orientation. In a heads up stereoscopic head set display, the cameras could be preferably mounted on the head set for visually monitoring physical objects in same space in which the user observes the projected stereoscopic images. In alternate embodiments other techniques may be used to determine the aforesaid positions and orientations without departing from the spirit and scope of the invention.

Figure 7:
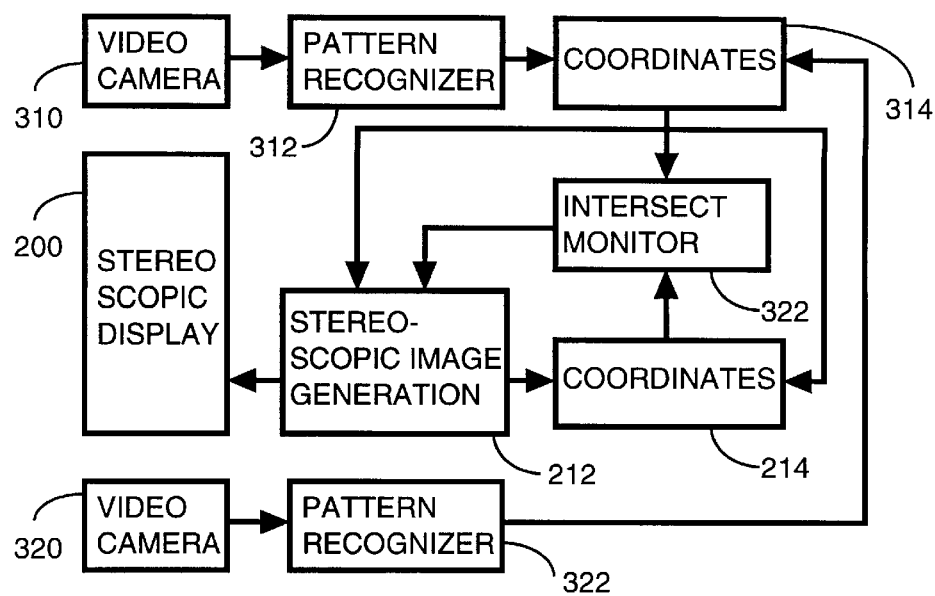
FIG. 7 shows a block diagram of the user interface system operating in accordance with the present invention.

FIG. 7 shows a block diagram of the user interface system operating in accordance with the present invention. A stereoscopic display 200 displays stereoscopic images generated by stereoscopic image generation means 212 in a manner know in the art. The stereoscopic display may be a CRT or LCD screen requiring filter glasses to be worn by the user to direct the appropriate image to the corresponding eye of the user. Alternately, it may be a heads up stereoscopic display worn by the user. Preferably display 200 is a display means especially adapted to displaying stereoscopic images without the aid of devices worn by the use. Cameras 310 and 320 produce images which are analyzed by pattern recognizers 312 and 322 which identify certain points of the image and their location within the image. As previously described, the pattern recognition may be performed with or without the aid of fiducial marks. The location of the points from pattern recognizers 312 and 322 are analyzed by coordinate determining means 314 which analyzes the angles relative to each point from each camera, and knowing the predetermined distance between the cameras, is able to determine the desired positions and orientations. Coordinate determining means 314 also makes available the position of the user and the position and orientation of the physical object so that the stereoscopic image generator 212 may generate the stereoscopic extension image in response thereto. Coordinate determining means 314 also makes available the position of the user to coordinate determining means 214 which determines the position of the interface image relative to the user by determining the distance between the left eye and right eye images displayed on display 200 with the user's position including the distance between the user and the display and the spacing between the eyes of the user. The positions of the physical object and interface image are then compared by intersection monitor 322 which generates a control signal in response to a substantial coincidence with the position of the physical object, or its stereoscopic extension image, and the position of the stereoscopic interface image.

Figure 8:
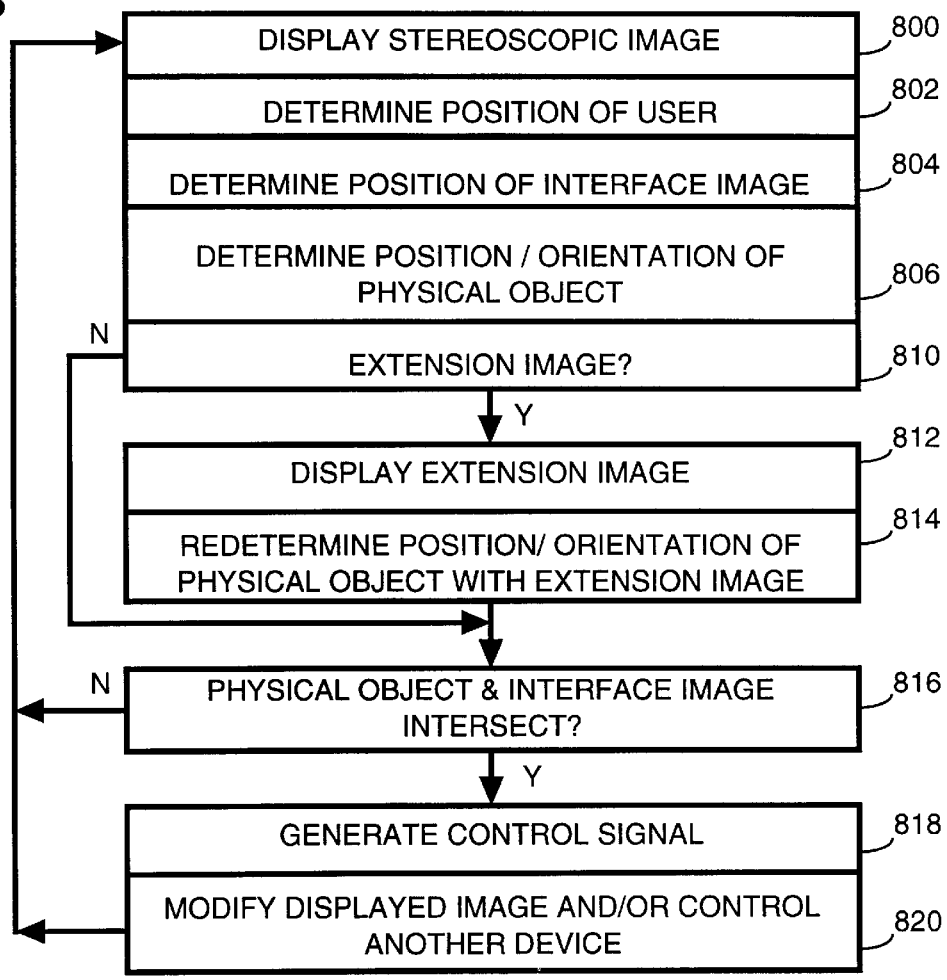
FIG. 8 shows a flow chart of a process operating in accordance with the present invention.

FIG. 8 shows a flow chart of a process operating in accordance with the present invention. In step 800, a stereoscopic image is displayed. Step 802 determines the position of the user as previously described. Note in alternate embodiments the position of the user may be predetermined. Then in step 804 the position of the stereoscopic interface image relative to the user is determined. Step 806 determines the position and orientation of the physical object and step 810 asks if and extension image is desired. If so, step 812 causes the display of the extension image and step 814 redetermines the position and orientation of the physical object with the extension image. Then step 816 determines if there is an intersection between the interface image and the physical object or its extension image. If so, step 818 generates a control signal which in step 820 modifies the displayed image and/or controls another device.

Thus what has been provided is a method and apparatus by which the intersection of a physical object and a stereoscopic object can be determined and be used to form a user interface with a computer system.

I claim:

1. A method of displaying a stereoscopic extension image as an extension of a physical object observable by a user comprising the steps of:

determining a position and orientation of the physical object; and displaying the stereoscopic extension image also observable by the user as the extension of the physical object in response thereto, wherein said step of displaying further comprises the step of determining a position of the user, and includes projecting the stereoscopic extension image relative to the determined position of the user and said step of determining the orientation of the physical object further comprises the steps of:

visually recognizing a first and a second point on the physical object;

determining a position of the first point and the position of the second point; and determining coordinates of a line defined by the positions of first and second points; and further wherein said step of displaying projects the stereoscopic extension image substantially along the line as observed by the user.

2. The method according to claim 1 wherein the physical object is a handle having at least the first and second points and the stereoscopic extension image is a projection of an end effect on the handle.

3. The method according to claim 1 wherein the stereoscopic extension image is a projection of one of a plurality of selectable end effects.

4. The method according to claim 1 further comprising the steps of:

displaying a stereoscopic interface image observable by the user;

determining an intersection of the stereoscopic extension image with the stereoscopic interface image; and generating the control signal in response thereto.

5. A method of generating a control signal comprising:

projecting a stereoscopic interface image in a space observable by a user;

enabling a physical object within in the space to be observable by the user in addition to the stereoscopic interface image;

determining an intersection of the physical object with the stereoscopic interface image; and generating the control signal in response to said step of determining wherein the physical object includes a stereoscopic extension image and the method further comprises the steps of:

determining a position and orientation of the physical object; and displaying the stereoscopic extension image as an extension of the physical object in response thereto, wherein said step of determining the intersection further comprises the step of determining an intersection of the stereoscopic extension image with the stereoscopic interface image and further wherein said step of projecting the stereoscopic interface image is projected by a display having a display surface and the space includes a front space between the display surface and the user and a behind space behind the display surface and wherein the stereoscopic interface image is projected in either the front space or the behind space, said step of displaying the stereoscopic extension image displays the stereoscopic extension image in either the front space or the behind space, and said step of determining the intersection further comprises the step of determining the intersection of the stereoscopic extension image with the stereoscopic interface image in either the front space or the behind space.

6. The method according to claim 5 wherein said step of projecting further projects an observable image including the stereoscopic interface image and the method comprises the step of modifying the observable image in response to the control signal.

7. The method according to claim 6 further comprising the step of determining a position of the user, wherein said step of determining the intersection determines the intersection of the physical object and the stereoscopic interface image relative to the position of the user.

8. The method according to claim 7 further comprising the step of visually monitoring the user and the physical object, and wherein said step of determining the position of the user is determined in response to said step of visually monitoring, and said step of determining the intersection of the physical object with the stereoscopic interface image is determined in response to said step of visually monitoring.

9. The method according to claim 5 further comprising the step of visually monitoring the physical object, and wherein said step of determining the intersection of the physical object with the stereoscopic interface image is determined in response to said step of visually monitoring.

10. A method of generating a control signal comprising:

projecting a stereoscopic interface image in a space observable by a user;

enabling a physical object within in the space to be observable by the user in addition to the stereoscopic interface image;

determining an intersection of the physical object with the stereoscopic interface image; and generating the control signal in response to said step of determining wherein the physical object includes a stereoscopic extension image and the method further comprises the steps of:

determining a position and orientation of the physical object; and displaying the stereoscopic extension image as an extension of the physical object in response thereto, wherein said step of determining the intersection further comprises the step of determining an intersection of the stereoscopic extension image with the stereoscopic interface image and further wherein said step of projecting the stereoscopic interface image is performed by a display having a display surface viewable by the user and the space includes a behind space behind the display surface and wherein the stereoscopic interface image is projected in the behind space, said step of determining the position and orientation of the physical object includes determining a position and orientation of the physical object to be between the user and the display surface, said step of displaying the stereoscopic extension image displays the stereoscopic interface image in the behind space, and said step of determining the intersection further comprises the step of determining an intersection of the stereoscopic extension image with the stereoscopic interface image in the behind space.

11. The method according claim 10 wherein the display surface substantially inhibits the user's observation of physical objects in the behind space.

12. The method according to claim 10 wherein said step of projecting further projects an observable image including the stereoscopic interface image and the method comprises the step of modifying the observable image in response to the control signal.

13. The method according to claim 10 further comprising the step of determining a position of the user, wherein said step of determining the intersection determines the intersection of the physical object and the stereoscopic interface image relative to the position of the user.

14. The method according to claim 13 further comprising the step of visually monitoring the user and the physical object, and wherein said step of determining the position of the user is determined in response to said step of visually monitoring, and said step of determining the intersection of the physical object with the stereoscopic interface image is determined in response to said step of visually monitoring.

15. The method according to claim 10 further comprising the step of visually monitoring the physical object, and wherein said step of determining the intersection of the physical object with the stereoscopic interface image is determined in response to said step of visually monitoring.

16. A stereoscopic user interface means for generating a control signal comprising:

a display means for projecting a stereoscopic interface image in a space observable by a user wherein said display means enables a physical object within in the space to be observable by the user in addition to the stereoscopic interface image; and a monitoring means for determining an intersection of the physical object with the stereoscopic interface image and for generating the control signal in response thereto, wherein the physical object includes a stereoscopic extension image and the stereoscopic user interface means further comprises a coordinate determining means for determining a position and orientation of the physical object, and wherein said display means displays the stereoscopic extension image as an extension of the physical object in response to said coordinate determining means, and said monitoring means determines an intersection of the stereoscopic extension image with the stereoscopic interface image to generate the control signal and further wherein said display means has a display surface and the space includes a front space between the display surface and the user and a behind space behind the display surface and wherein the stereoscopic interface image is projected in either the front space or the behind space, the stereoscopic interface image is displayed in either the front space or the behind space, and said monitoring means determines intersection of the stereoscopic extension image with the stereoscopic interface image in either the front space or the behind space.

17. The stereoscopic user interface means according to claim 16 further comprising a coordinate determining means for determining a position of the user, wherein said monitoring means determines the intersection of the physical object and the stereoscopic interface image relative to the position of the user.

18. A stereoscopic user interface means for generating a control signal comprising:

a display means for projecting a stereoscopic interface image in a space observable by a user wherein said display means enables a physical object within in the space to be observable by the user in addition to the stereoscopic interface image; and a monitoring means for determining an intersection of the physical object with the stereoscopic interface image and for generating the control signal in response thereto, wherein the physical object includes a stereoscopic extension image and the stereoscopic user interface means further comprises a coordinate determining means for determining a position and orientation of the physical object, and wherein said display means displays the stereoscopic extension image as an extension of the physical object in response to said coordinate determining means, and said monitoring means determines an intersection of the stereoscopic extension image with the stereoscopic interface image to generate the control signal and further wherein said display means has a display surface viewable by the user and the space includes a behind space behind the display surface and wherein the stereoscopic interface image and the stereoscopic extension image are projected in the behind space, said coordinate determining means determining the position and orientation of the physical object to be between the user and the display surface, and said monitoring means determines the intersection of the stereoscopic extension image with the stereoscopic interface image in the behind space.

19. The stereoscopic user interface means according to claim 18 wherein said display means further projects an observable image including the stereoscopic interface image, and the stereoscopic user interface means comprises an image generation means for modifying the observable image in response to the control signal.

20. The stereoscopic user interface means according to claim 18 further comprising a coordinate determining means for determining a position of the user, wherein said monitoring means determines the intersection of the physical object and the stereoscopic interface image relative to the position of the user.

* * * * *